United States Patent [19]

Isaac

[11] 3,904,598

[45] Sept. 9, 1975

[54] PROCESS FOR THE RECOVERY OF HELLEBRIN

[75] Inventor: Otto Isaac, Bruchkobel, Germany

[73] Assignee: Deutsche Gold- und Silber-Scheideanstalt vormals Roessler, Frankfurt am Main, Germany

[22] Filed: July 27, 1971

[21] Appl. No.: 166,596

[30] Foreign Application Priority Data

July 31, 1970 Germany............................ 2038110

[52] U.S. Cl. ............................................. 260/210.5
[51] Int. Cl.² .......................................... C07J 19/00
[58] Field of Search ................................... 260/210.5

[56] References Cited
UNITED STATES PATENTS 3,510,472   5/1970   Buchner......................... 260/210.5

OTHER PUBLICATIONS

Petricic, "Chem. Abst.," Vol. 67, 1967, p. 57272c.

*Primary Examiner*—Johnnie R. Brown
*Attorney, Agent, or Firm*—Cushman, Darby & Cushman

[57] ABSTRACT

Hellebrin is obtained from hellebrin containing extracts by absorbing on silica gel having a particle size of 0.15–10 mm., preferably 0.15–0.30. After eluting the hellebrin from the silica gel it is preferably recovered by heating in an alcohol or cyclic ether until crystallization occurs.

16 Claims, No Drawings

PROCESS FOR THE RECOVERY OF HELLEBRIN

The heart active glycoside hellebrin is contained in the roots of the Helleborus species. It is of increased therapeutic interest because of its intermediate position between Stropanthus and Scilla glycosides.

It is known that a glycoside acting in a manner similar to digitalis can be recovered from Helleborus niger by treating aqueous Helleborus with carbon, the carbon adsorbate extracted with organic solvents and the extract obtained subjected to a further purification (German Pat. No. 605,073). The carbon treatment can also precede a lead precipitation wherein the excess lead is removed with phosphate (Helv. Chim. Acta 26, 1353(1943) or with sulfate (Farmacia (Bucharest) 7 407 (1959)). This process is not satisfactory.

The disadvantages of the adsorptive precipitation are avoided according to a new process if Helleborus extract is treated successively with different solvents (Czechoslovakian Pat. No. 101,577). This process, however, not only requires a large expenditure of solvents but reworking has shown that as a rule the process does not lead to crystallizable hellebrin.

There has also been described a chromatographic purification of Helleborus extract on aluminum oxide in combination with a preceding lead precipitation [Med. prom. SSR 18, 12 (1964)] or without such pretreatment [Planta med. 9, 64 (1961)]. The yield of hellebrin, however, only amounts to 0.04%.

More favorable yields are obtained by chromatography or silica gel [Z. Naturforschg. 20b, 707(1965); Acta Pharm. Jug. 17, 29 (1967)]. In the previously used silica gels, however, it is a matter of using finely divided silica gels (particle size 0.01 to 0.04 mm, which only permit moderate speeds. Also the capacity of silica gel columns generally is only half as much as that of alumina columns of equal size. Thus this method of separate up to now has been suited only for the recovery of small amounts of hellebrin.

In the known purification processes using silica gel therefore there must be employed large amounts of silica gel. As is shown in the cited literature it is necessary for example to use 50 to 1,000 parts of silica gel per part of preliminarily purifed extract. In spite of this the hellebrin obtained is not sufficiently pure and there must frequently be added a further purification by preparative thin layer chromatography.

The invention is directed to a process for the recovery of hellebrin by chromatography on silica gel from hellebrin containing extracts and is characterized by the use of large-grained silica gel with particle size of 0.15–10 mm.

According to the process of the invention it is only necessary to use 5–10 parts of silica gel for each part of extract preliminarily purified in like manner. Besides the product obtained is already so pure that there is no longer any need to employ an additional thin layer chromatographic purification.

This improved separatory action of large-grained silica gel with hellebrin containing extracts is highly unexpected since because of the substantially smaller surface area of the large-grained silica gel there would be expected a considerably poorer separatory effect.

The industrial advantage of the process of the invention is in the saving of silica gel and the greater speed. Furthermore, in contrast to the known processes it is now also possible to furnish the extracts to the column in concentrated or even in more solid form without the danger of clogging, impairing the speed of flow by a significant amount or impairing the separation.

The process of the invention operates according to the known and customary adsorptive purification and separation methods (for example chromatography) in which an extract of the drug is added. In regard to the extract there can be treated a dry extract, a semi-solid extract or a liquid extract. As the liquid extractant there can be employed solvents in which hellebrin is soluble, for example chloroform, methanol and the customary alcohols, e.g. aqueous ethyl alcohol, etc. The production of the hellebrin containing extract, especially an extract of the helleborus type takes place in customary manner.

It is suitable if the extract is preliminarily purified in customary manner. Such a preliminary purification in general consists of the following steps.

a. The removal of fat can take place with aliphatic and aromatic hydrocarbons, aliphatic halohydrocarbons or ethers, as for example benzene, methylene chloride, chloroform, petroleum ether, diethyl ether.

It is convenient to begin the preliminary purification with the removal of fat. However, it is also possible to undertake the removal of fat after step (b).

b. Extraction with alcohols or alcohol-water mixtures, subsequent removal of the alcoholic solvent and transfer to the aqueous phase. c. Extraction of the hellebrin from the aqueous phase with an organic agent, for example halohydrocarbon-alcohol mixtures, e.g. chloroform-ethyl alcohol, etc. This extract is then either partially or totally evaporated.

To carry out the process of the invention for example a hellebrin containing extract in concentrated form preliminarily purified in the usual manner is placed on a column with large-grained silica gel and developed with a halohydrocarbon-alcohol mixture whereby the largest part of the ballast material with a higher Rf value than Hellebrin is eluted. Thus there can be used chloroform/ethyl alcohol (99 to 30 parts chloroform to 1 to 20 parts alcohol by volume).

For the final elution of the hellebrin fraction it is generally suitable to increase the hydrophilic (alcohol) component of the eluting mixture or, in case for example the previous elution was with a halohydrocarbon, e.g. chloroform, methylene chloride, carbon tetrachloride, ethylene dichloride, ethylene dibromide, amyl chloride, hexyl chloride, butyl chloride, sec. butyl chloride, butyl bromide, to only add a hydrophilic component, e.g. methyl alcohol, ethyl alcohol, butyl alcohol, hexyl alcohol, t-butyl alcohol, amyl alcohol, propyl alcohol or isopropyl alcohol.

Ballast materials with lower Rf values than hellebrin remain on the column.

Instead of column chromatography it is possible to use other chromatographic forms as for example preparative layer chromatography.

As the eluting agents there can be used aliphatic halohydrocarbons such as those mentioned above for examples, mixtures of aliphatic halohydrocarbons with aliphatic alcohols such as those set forth above, esters of aliphatic acids with aliphatic alcohols, e.g. methyl acetate, ethyl acetate, methyl propionate, ethyl propionate, ethyl formate, methyl butyrate, ester-alcohol mixtures, ester-alcohol-water mixtures, benzene, halobenzene, bromobenzene, 1,2-dichlorobenzene, 1,4-dichlorobenzene, alkyl benzenes, e.g. toluene, o- xylene, p-xylene, m-xylene, ethyl benzene, alkyl benzene-alcohol mixtures, ester-pyridine mixtures, halohydrocarbon-pyridine mixtures, halohydrocarbon-alcohol-pyridine mixtures, ester-pyridine-water mixtures, mixtures of benzene, halobenzenes and alkyl benzenes with pyridine, aliphatic ketones, e.g. acetone, methyl ethyl ketone, diethyl ketone, methyl butyl ketone, ketone-water mixtures, ketone-benzene mixtures, ketone-benzene-acetic acid mixtures, etc. It should be understood that other mixtures of the above recited components can be employed. The optimum proportions of the components of the mixture is always readily ascertained in a separate preliminary test.

It is a matter of using as eluting agents known liquid organic agents in which the number of carbon atoms of the halohydrocarbon as well as the individual akyl groups of these agents preferably is low and for example is between 1 and 6.

The silica gel used in the process of the invention is a synthetically produced high porus silica in the form of hard granules with a granular size of 0.15–10 mm. Especially favorable is a particle size of 0.15–0.30 mm. The water content can, for example be up to 10%. The specific surface area can be up to 650 m$^2$/g. Generally it is about 400 m$^2$/g. and can be as low as 300 m$^2$/g. The bulk density (apparent density) can be from 400 g/l to 750 g/l. Preferable is a bulk density of 450–500 g/l.

The determination of the hellebrin enriched fraction suitably takes place by thin layer chromatography. The hellebrin obtained after removal of the eluting agent can, of course, be recrystallized again in the usual manner (for example from methanol-ethyl acetate or methanol-water).

As especially favorable refinement of the process of the invention is as follows:

The hellebrin eluate is freed from the solvent and the residue heated to crystallization with aliphatic or cycloaliphatic alcohols or liquid cyclic ethers, e.g. methyl alcohol, ethyl alcohol, isopropyl alcohol, butanol-1, hexyl alcohol, cyclohexyl alcohol, dioxane, tetrahydrofuran.

Thereby after a certain time the hellebrin separates out in crystalline form from the initially clear solution. The precipitation is not caused by loss of solvent since substantially no solvent is lost during the heating.

The organic solvents used in this procedure should be as free as possible from water, for example the water content should not amount to more than 10%. There is used sufficient solvent that the hellebrin extract is completely soluble in the hot. The amount of solvent to be used is suitably determined in a simple special preliminary test.

The solution is then heated until crystals begin to separate from the hot solution. This point in time of the beginning of the separation of crystals is dependent upon the hellebrin content of the extract employed. Hellebrin rich extracts crystallize quicker than hellebrin poor extracts. With very low hellebrin extracts it is recommended to enrich them by known methods to a hellebrin content of 10% or higher.

In general the thus separated hellebrin still contains solvent. This can be removed by subsequent drying, for example at 100°C. in a vacuum. It goes without saying that it is also possible to recrystallized the separate hellebrin again in usual manner, for example from methanol-water.

The time until the first separation of crystals of hellebrin for example can be between 5 minutes and 2 hours. It is suitable to heat further for about an additional hour from the time of the first separation of crystals in order to quantitatively complete the separation. The solution can then, for example, be deliberately cooled or the solution can be allowed to cool by standing.

In general it is recommended to heat to a temperature between 50° and 180°C. Especially favorable are temperatures between 70° and 130°C.

As the alcohols used for the heating primarily there are employed saturated aliphatic and cycloaliphatic alcohols, (alkanols and cycloalkanols) especially monohydric alcohols. The number of carbon atoms can for example be between one and eight carbon atoms, in the case of cycloaliphatic alcohols especially between five and eight carbon atoms. Of the aliphatic alcohols those with one to six carbon atoms are preferred.

As cyclic ethers for example there can be used the saturated cyclic ethers with five to eight members in the ring, especially five to six ring members and containing one or two oxygen atoms: The oxygen atoms of these ethers must form true ether compounds, i.e., in the case of two oxygen atoms they must be separated by at least two carbon atoms.

It is convenient, if the boiling point of the solvent used is not over 180°C. Preferred are solvents with a boiling point between 50° and 180°C., especially from 70° to 180°C.

Examples of such solvents are methanol, ethanol, propanol, butanol-2, isopropanol, pentanol, hexanol, heptanol, 2-ethylhexanol, cyclopentanol, cyclohexanol, 2-methyl cyclohexanol, dioxane, tetrahydrofuran, tetrahydropyrane, etc.

It is suitable to heat under reflux. Naturally it is also possible to maintain the fixed temperature by other conventional means. Stirring can be employed.

The hellebrin extract which is to be heated should be as dry as possible. At a larger residual content of water (for example over 10%) or of a solvent, not having the hot precipitation effect e.g. halohydrocarbon or aromatic hydrocarbon, alphatic ketone or the like, no crystallization is noted. It is suitable to remove water or residual solvent present by previously known methods or to bring them below 70%.

Unless otherwise indicated all parts and percentages are by weight.

EXAMPLE 1

100 kg. of dried Helleborus root was pulverized and defatted with petroleum ether. The defatted drug was exhaustively extracted with methanol. The residue of the methanolic extract was dissolved in water and extracted with chloroform-ethanol (2:1 by volume). The chloroform phase was evaporated to an extract material content of about 50%. The concentrate was supplied to a column with 50 kg of silica gel (particle size 0.15–0.30 mm., SiO$_2$ content 95–96%, water of constitution 4%, specific surface area about 400 m$^2$/g, pore diameter about 90 A., specific heat 0.22 cal/g/°C., bulk density 450–500 g/l, true specific weight 2.3, heat of moistening with water 18 cal/g, pore volume 0.7–0.8 ml/g). It was eluted with chloroform/methanol (90:10 by volume) until hellebrin was detectable in the eluate by thin layer chromatography. Then the main amount of the hellebrin was dissolved from the column with chloroform/methanol (85:15 by volume). The hellebrin rich fractions were united and dried. The residue was heated under reflux with 5 times the amount of absolute alcohol until the hellebrin precipitated out in the form of fine crystals. After cooling the crude hellebrin was filtered off with suction and recrystallized from methanol-water. Yield 198 grams.

What is claimed is:

1. In a process for the recovery of hellebrin by adsorptive purification of a hellebrin containing extract on silica gel the improvement comprising using silica gel with a particle size of 0.15–10 mm.

2. A process according to claim 1 wherein the particle size is 0.15–0.30 mm.

3. A process according to claim 1 wherein the purification is carried out column chromatographically.

4. A process according to claim 1 comprising eluting the hellebrin from the silica gel with a mixture of aliphatic halohydrocarbon and an alkanol in which the hellebrin is soluble.

5. A process according to claim 4 wherein the solvent is removed from the eluted material and the residue is heated with an alkanol until the hellebrin first dissolves and then crystallizes out of solution without substantial loss of solvent.

6. A process according to claim 1 wherein the hellebrin is eluted from the silica gel with a solvent, the solvent is removed from the eluted material and the residue is heated with an oxygen containing solvent which is an alkanol having one to eight carbon atoms, a cycloalkanol having five to eight carbon atoms or a cyclic ether having five to eight ring atoms including one to two ring oxygen atoms and the balance carbon atoms until the hellebrin first dissolves and then crystallizes out of solution without substantial loss of solvent.

7. A process according to claim 6 wherein said oxygen containing solvent is an alkanol having one to six carbon atoms, a cycloalkanol having five to six carbon atoms in the ring or a cyclic ether having five to six atoms in the ring, said oxygen containing solvent having a boiling point between 50° and 180°C.

8. A process according to claim 7 wherein said silica gel has a particle size of 0.15–0.30 mm, a specific surface area of 400 m$^2$/g and the oxygen containing solvent is ethyl alcohol.

9. A process according to claim 6 wherein the solvents employed to dissolve the residue does not contain over 10% water.

10. A process according to claim 1 wherein there are used up to 10 parts of silica gel for each part of extract purified thereby.

11. A process according to claim 1 wherein the improvement consists essentially of using silica gel of particle size of 0.15–10 mm.

12. A process according to claim 11 wherein the hellebrin is eluted from the silica gel with a solvent, the solvent is removed from the eluted material and the residue is heated with an oxygen containing solvent which is an alkanol having one to eight carbon atoms, a cycloalkanol having five to eight carbon atoms or a cyclic ether having five to eight ring atoms including one to two ring oxygen atoms and the balance carbon atoms until the hellebrin first dissolves and then crystallizes out of solution with substantially no loss of solvent during the heating, the heating being between 50° and 180°C.

13. A process according to claim 12, wherein the solvent is removed from the eluted material by drying.

14. A process according to claim 4 wherein the solvent is removed from the eluted material by drying.

15. A process according to claim 4, comprising heating the eluted material with an alkanol until the hellebrin first dissolves and then crystallizes out of solution without substantial loss of solvent.

16. A process according to claim 5 wherein the heating is at a temperature up to 180°C.

* * * * *